United States Patent
Violand et al.

(10) Patent No.: US 7,234,312 B2
(45) Date of Patent: *Jun. 26, 2007

(54) VARIABLE SPEED, ELECTRONICALLY CONTROLLED, ROOM AIR CONDITIONER

(75) Inventors: Gary Violand, Milltown, NJ (US); Paul Fasolo, South Plainfield, NJ (US)

(73) Assignee: Electrolux Home Products, Inc., Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/280,491

(22) Filed: Nov. 16, 2005

(65) Prior Publication Data

US 2006/0064996 A1  Mar. 30, 2006

Related U.S. Application Data

(63) Continuation of application No. 10/725,674, filed on Dec. 2, 2003, now Pat. No. 6,968,707.

(51) Int. Cl.
*F25B 1/00* (2006.01)

(52) U.S. Cl. .......................................... 62/115; 62/186

(58) Field of Classification Search .................... 62/89, 62/132, 108, 186, 228.4, 229, 234, 115; 417/2, 417/201, 202, 426

See application file for complete search history.

(56) References Cited

U.S. PATENT DOCUMENTS

| | | | |
|---|---|---|---|
| 38,406 A | 5/1863 | Faris et al. | |
| 4,819,714 A * | 4/1989 | Otsuka et al. | 165/217 |
| 4,856,081 A * | 8/1989 | Smith | 455/151.4 |
| 4,942,921 A | 7/1990 | Haessig et al. | |
| 4,948,040 A | 8/1990 | Kobayashi et al. | |
| 4,969,508 A * | 11/1990 | Tate et al. | 165/209 |
| 5,062,276 A | 11/1991 | Dudley | |
| 5,201,192 A | 4/1993 | Hara | |
| 5,325,286 A | 6/1994 | Weng et al. | |
| 5,454,510 A * | 10/1995 | Manson et al. | 236/46 R |
| 5,457,766 A | 10/1995 | Ko | |
| 5,555,736 A | 9/1996 | Wills et al. | |
| 5,587,642 A | 12/1996 | Manson et al. | |
| 5,833,134 A | 11/1998 | Ho | |
| 5,857,906 A | 1/1999 | Cho | |
| 5,918,475 A | 7/1999 | Sakakibara et al. | |
| 6,000,232 A | 12/1999 | Witten-Hannah et al. | |

(Continued)

FOREIGN PATENT DOCUMENTS

JP  9-303840 A  * 11/1997
JP  11264598 A  9/1999

*Primary Examiner*—Mohammad M. Ali
(74) *Attorney, Agent, or Firm*—Pearne & Gordon LLP

(57) ABSTRACT

A variable speed air handling system for cooling and/or heating a room including a sleep mode. The system includes a fan assembly to transport air from the system into the room, the fan assembly having a substantially continuously adjustable speed within a range of speeds defined by a predetermined upper limit and a predetermined lower limit. A user interface transmits a sleep mode signal upon activation of the sleep mode by a user. A control unit controls the fan assembly and the climate control unit to gradually raise an ambient temperature in the room over a predetermined period of time in response to the sleep mode signal transmitted by the user interface.

20 Claims, 11 Drawing Sheets

U.S. PATENT DOCUMENTS

| | | |
|---|---|---|
| 6,002,218 A | 12/1999 | Toda et al. |
| 6,220,416 B1 | 4/2001 | Katoh et al. |
| 6,329,727 B1 | 12/2001 | Traveis et al. |
| 6,407,525 B1 | 6/2002 | Horng et al. |
| 6,453,687 B2 * | 9/2002 | Sharood et al. ............... 62/127 |
| 6,540,017 B2 * | 4/2003 | Sugawara et al. .......... 165/238 |
| 6,619,060 B1 | 9/2003 | Davis et al. |
| 6,684,944 B1 | 2/2004 | Byrnes et al. |
| 6,744,172 B2 | 6/2004 | Duhua |
| 6,836,849 B2 | 12/2004 | Brock et al. |

* cited by examiner

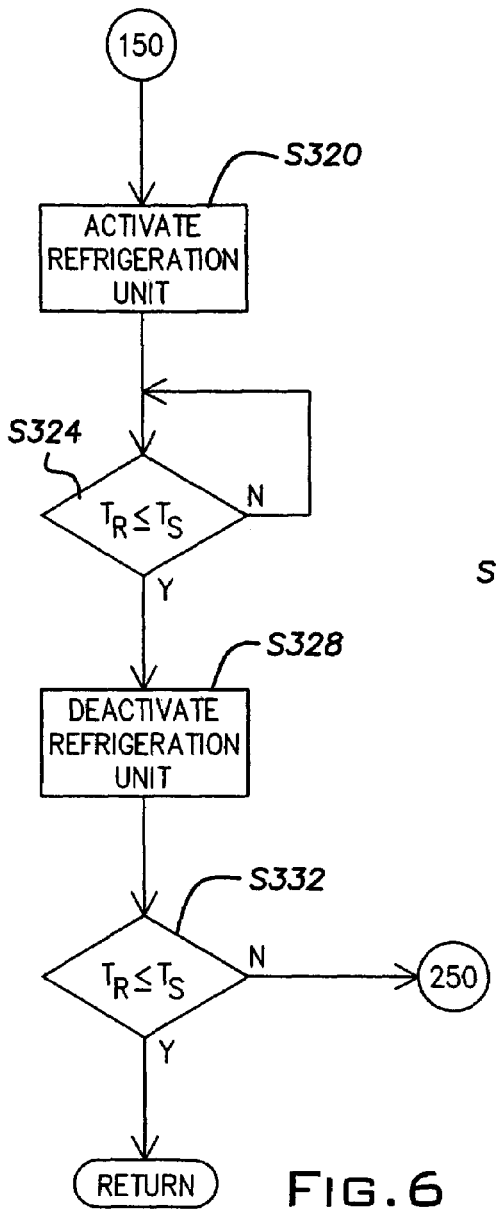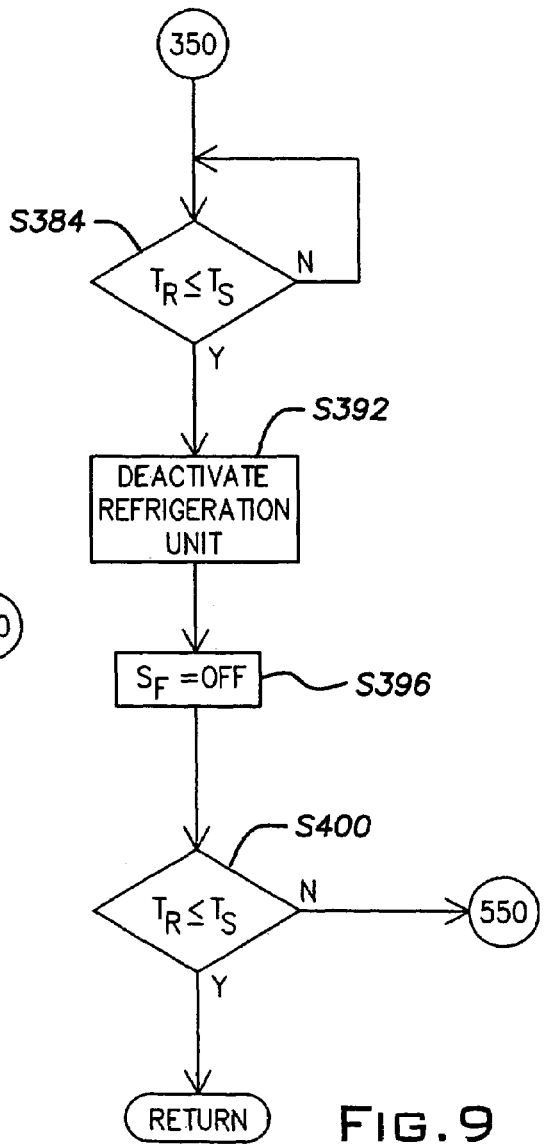
FIG. 6
FIG. 9

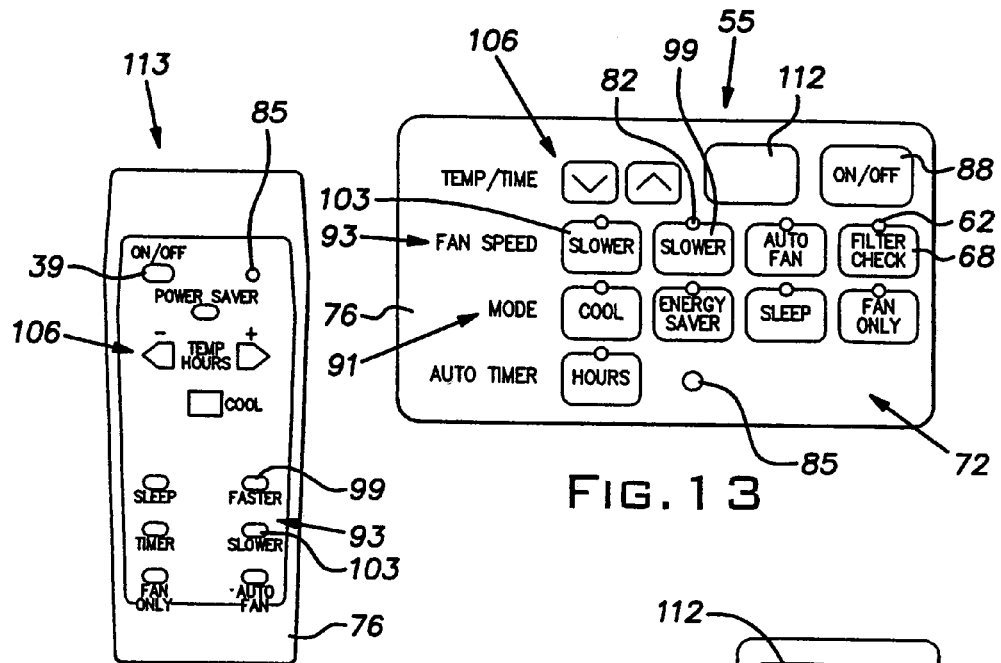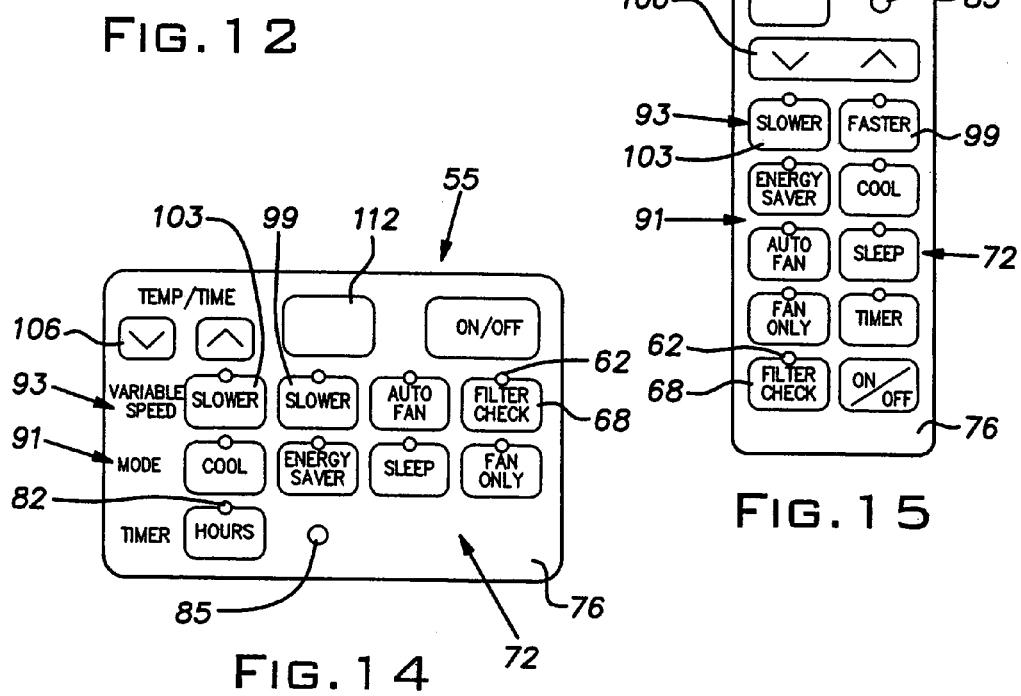

VARIABLE SPEED, ELECTRONICALLY CONTROLLED, ROOM AIR CONDITIONER

BACKGROUND OF THE INVENTION

The present invention relates generally to air handling systems, and more particularly to air conditioners that are variably adjustable over a range of operating speeds to blow air at desired rates.

Conventional air conditioners include a refrigeration unit, a motor driven fan to direct air over a heat exchanger cooled by the refrigeration unit, intake and exhaust ports, and a control portion to allow an operator to select a predetermined operational speed of the fan. The air conditioner is controlled according to a relationship between a desired temperature setting input via the control portion, and a temperature of the room to be cooled as sensed by a thermistor. When the sensed temperature exceeds the desired temperature by a predetermined value, the refrigeration unit is activated to cool the heat exchanger which, in turn, cools air being directed over the heat exchanger by the fan. The refrigeration unit is deactivated when the sensed temperature falls below a predetermined value related to the set temperature.

While the refrigeration unit is usually operated between on and off states, the control portion allows the fan to be operated at a number preprogrammed fan speed settings that are selectable depending on the degree of cooling desired. In hot environments such as a room having windows through which sunlight directly enters the room, a first, high setting can be selected to operate the fan motor near its maximum speed. When a minimal amount of cooling is desired, the control portion can be adjusted to operate the fan motor at a second, low speed. Similarly, in moderate temperature environments, the control portion can be adjusted to another discrete, mid level setting to operate the fan motor at an intermediate speed between the maximum and minimum speeds. Adjustment between the fan motor speed is sudden and requires the user to select one of the preprogrammed speeds, which are often too fast or too slow to satisfy particular cooling demands.

When the refrigeration unit is operated for a prolonged period of time, humidity in air passing through the air conditioner can condense and freeze on a heat exchanging surface of the heat exchanger. As the frozen humidity accumulates, the ability of the heat exchanger to transfer heat to air being blown over the heat exchanger is impaired, thus affecting the cooling ability of the air conditioner.

Prolonged operation of the air conditioner at a single set temperature may not be desirable. As occupants of a room sleep, their bodily functions slow down, causing a drop in body temperature. The air conditioner operating at the set temperature continues to discharge cool air into the room when the cool air is not needed. The operation of the air conditioner at the set temperature during a period of time when cool air is not needed leads to wasted electrical energy and discomfort to those sleeping in the room.

The size of air conditioner selected for a particular application depends on the size of the area to be cooled. Components, including the motor for driving the fan, will be sized to meet the cooling demands of the area in which the air conditioner is to be installed. As the cooling demands increase, so must the size of the fan motor installed in a particular air conditioner to move a sufficient amount of air over the heat exchanger to satisfy the cooling demands. This requires a manufacturer of air conditioners to warehouse components such as fan motors of different sizes and ratings to allow the installation of suitably sized fan motors across an entire line of products.

When the air conditioner is operating, visual identification of the selected operating speed of the fan motor is not visible from a distance away from the air conditioner. Switches or rotatable knobs provided to a front of the air conditioner are small, and typically disposed within a housing accessible through a pivoting door. To view or adjust the selected operating speed of the fan in a dimly lit room one must approach the air conditioner with a light.

Accordingly, it would be beneficial to provide an air conditioner having a fan motor that can be substantially continuously adjusted to a speed within a range of speeds to accurately meet the cooling demands where the air conditioner is installed. The air conditioner should be adjustable via a user interface at the front of the air conditioner and from a remote location, provided with frost protection to minimize the accumulation of frost on a heat exchanging surface, and should be capable of accepting components that will efficiently meet the cooling demands of a plurality of environments. Further, the fan speed should be visible from a distance from the air conditioner.

SUMMARY OF THE INVENTION

In accordance with one aspect, the present invention provides a variable speed air handling system for heating and/or cooling a room, the system comprising a fan assembly to transport air from the system into the room, the fan assembly having a substantially continuously adjustable speed within a range of speeds defined by a predetermined upper limit and a predetermined lower limit; a user interface to transmit a signal in response to a desired speed of the fan assembly input by an operator via the user interface; a control unit for substantially continuously adjusting the speed of the fan assembly to a speed in the range of speeds in response to the signal transmitted by the user interface; and a climate control unit for heating and/or cooling the air to be transported from the air conditioner by the fan assembly.

In accordance with another aspect, the present invention also provides a variable speed air handling system for heating and/or cooling a room, the air handling system comprising a user interface that transmits a signal in response to a desired operational mode of the air handling system input by an operator via the user interface; a controller for transmitting a control signal in response to the signal transmitted by the user interface; a climate control unit for heating and/or cooling air to be discharged from the air handling system into the room; a heat exchange surface in thermal communication with the climate control unit; a fan assembly to transport air from an external environment into the room after having thermal energy removed by the climate control unit, the fan having a substantially continuously variable speed; and a sensor disposed to sense a frost condition on the heat exchange surface, wherein operation of the climate control unit is prevented for a period of time lasting until the sensor detects the elimination of at least a portion of the frost condition, wherein the fan is continuously operated during the period of time when operation of the climate control unit is prevented.

In accordance with another aspect, the present invention also provides a method of controlling a variable speed air handling system to be installed in a window of a room, the air handling system comprising a control unit, a climate control unit, and a fan assembly including a fan motor for driving a fan, the method comprising the steps of providing a user interface to allow at least a desired operational mode of the air handling system and a desired speed of the fan motor to be input by an operator; controlling an operation of the climate control unit in response to the desired operational mode input via the user interface; and adjusting a speed of the fan motor in a substantially continuous manner to drive the fan at the desired speed of the fan motor input via the user interface.

BRIEF DESCRIPTION OF THE SEVERAL VIEWS OF THE DRAWING

The foregoing and other features and advantages of the present invention will become apparent to those skilled in the art to which the present invention relates upon reading the following description with reference to the accompanying drawings, in which:

FIG. 6 is a flow chart illustrating a method of controlling a variable speed air conditioner according to a COOL operational mode subroutine without an AUTO FAN function activated in accordance with the present invention;

FIG. 9 is a flow chart illustrating a method of controlling a variable speed air conditioner according to a ENERGY SAVER operational mode subroutine without an AUTO FAN function activated in accordance with the present invention;

FIG. 12 is an illustration of a remote user interface for controlling operation of a variable speed air conditioner in accordance with the present invention;

FIG. 13 is an illustration of a user interface for controlling operation of a variable speed air conditioner in accordance with the present invention;

FIG. 14 is an illustration of a user interface for controlling operation of a variable speed air conditioner in accordance with the present invention; and FIG. 15 is an illustration of a user interface for controlling operation of a variable speed air conditioner in accordance with the present invention.

DETAILED DESCRIPTION OF AN ILLUSTRATIVE EMBODIMENT

Figure 1A:
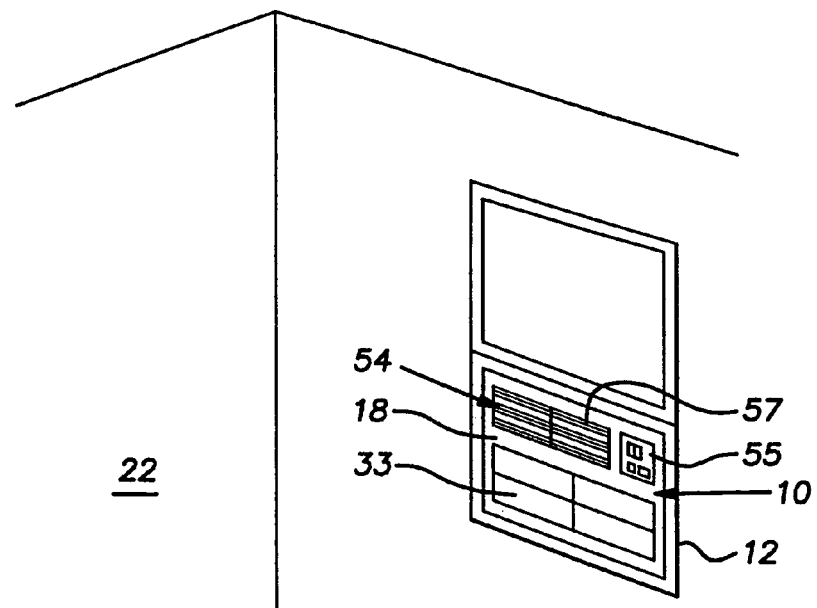
FIG. 1A is a perspective view of a variable speed air conditioner installed in a window frame of a room.

Certain terminology is used herein for convenience only and is not to be taken as a limitation on the present invention. Further, in the drawings, the same reference numerals are employed for designating the same elements throughout the figures, and in order to clearly and concisely illustrate the present invention, certain features may be shown in somewhat schematic form.

FIG. 1A illustrates a variable speed room air conditioner 10 disposed in a window frame 12 in a manner known in the art. Although depicted in a window frame 12 in FIG. 1A, the air conditioner 10 can be adapted for installation in any aperture formed in an external wall of an enclosed structure such as a house, garage, storage unit, school and office building. An interior face 18 of the air conditioner 10 projects into a room 22 from the window frame 12 while a fresh air inlet (not shown) projects externally from the window frame 12 in a position to draw fresh air from an external environment. With the air conditioner 10 arranged in this manner the interior face 18 is readily accessible by an operator in the room 22. Further, the variable speed concepts of the present invention can be applied to other types of equipment including split systems, heat pumps, electric heat units and package terminal air conditioners.

Figure 1B:
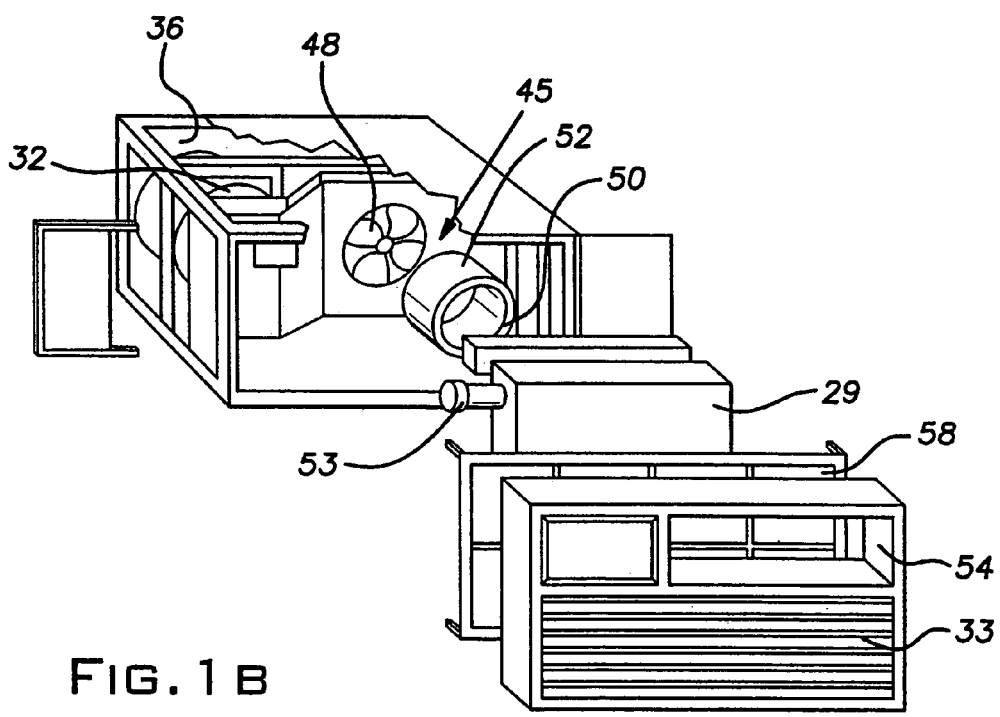
FIG. 1B is an exploded view of an illustrative arrangement of a variable speed air conditioner in accordance with the present invention.

Referring to FIG. 1B, the air conditioner 10 includes a refrigeration unit 26 that is in thermal communication with a heat exchanger 29 to cool air to be discharged into the room 22. Similar to most air conditioners, the refrigeration unit 26 includes a compressor 32 that compresses and discharges a gaseous refrigerant (not shown) at a high pressure and temperature to a condenser 36. By condensing the refrigerant, heat energy produced by the refrigerant is transferred from the condenser 36 to the surrounding air, thus cooling the refrigerant. The refrigerant is then depressurized and cooled even further upon passing through a capillary tube (not shown) prior to entering the heat exchanger 29. As with most conventional air conditioners, the heat exchanger 29 includes an evaporator with a series of hollow tubular coils through which the refrigerant passes. While passing through the evaporator the refrigerant is evaporated by heat removed from air being blown over a surface of the evaporator by a fan assembly 45, thus cooling the air to be discharged into the room 22. The evaporated refrigerant is then returned to the compressor 32 and the cycle is repeated for as long as the refrigeration unit 26 is activated. The refrigeration unit is activated and deactivated by turning the compressor 32 on and off, respectively. Further, it should be appreciated that an expansion valve can be used in place of the capillary tube.

The fan assembly 45 draws fresh air from the external environment and discharges it into the room 22 after being cooled by the air conditioner 10 as described above. The fan assembly 45 includes a fan 48 for an outside air system and a blower wheel 50 for an indoor air system, both driven by a fan motor 52. An example of a suitable fan motor 52 is an induction motor such as a permanent split capacitor type motor having a single main winding and an auxiliary winding. Such a motor is suitable for the air conditioner 10 in that its simple design and operation allow for the speed of the fan motor 52 to be controlled by regulating the voltage supplied thereto. However, any motor with a speed that can be varied by controlling an electrical power signal supplied to it, including a shaded pole motor, a split phase motor, or any other induction motor, may be used as the fan motor 52 of the air conditioner 10 according to the present invention. Alternatively, the fan 48 and the blower wheel 50 could each be driven by a separate motor. Further, other types of air movers could be used in place of the fan and/or the blower wheel.

The fan assembly 45 also minimizes the accumulation of frozen humidity from the air on the heat exchanger 29. Water entrained in the air being drawn from the room 22 condenses on a surface of the heat exchanger 29 as the air is cooled. When the heat exchanger 29 is supplied with the low temperature, low pressure refrigerant for a sufficiently long period of time, the surface of the heat exchanger 29 reaches a temperature low enough to freeze the condensate from the air. An accumulation of the frozen condensate on the surface of the heat exchanger 29 inhibits the efficient transfer of thermal energy between the heat exchanger 29 and the air.

A frost sensor 53, such as a thermistor, is provided to sense the presence of frost on the surface of the heat exchanger 29. The frost sensor 53 transmits a signal in response to the detection of frost, which controls the refrigeration unit 26 and fan assembly 45 in a manner described below to minimize further accumulation of the frost.

A user interface 55, a cool air outlet 54, and a front panel 33 through which an interior of the air conditioner 10 is accessible are provided at the interior face 18 of the air conditioner 10. As further described below, FIGS. 12–15 show various illustrative examples of user interfaces 55, although other user interfaces can be used according to the present invention. The cool air outlet 54 includes a grille 57 having an adjustable position to allow air from the air conditioner 10 to be discharged in a variety of directions as desired by the operator. Pivoting assemblies (not shown) couple the grille 57 to the air conditioner 10 allowing the grille 57 to be pivoted about horizontal and/or vertical axes.

The front panel 33, at least a portion of which is removable or capable of being opened to allow access to the interior of the air conditioner 10, conceals an air filter 58 that removes an amount of debris from the air being discharged from the air conditioner 10 into the room 22. Such air filters 58 are commonly known in the art and can be formed from porous paper products, a foam, intertwined fibers, or any other substance that will allow air to pass with minimal resistance while removing an amount of debris entrained in the air. However, the pressure drop experience by the air passing through the air filter 58 increases as debris accumulates in the air filter 58. At such time when the debris collected by the air filter 58 inhibits the discharge of cool air from the air conditioner 10, an operator will be notified of the need to clean the air filter 58. The notification can be visible and/or audible, and can be reset once the air filter 58 has been cleaned. As shown in FIGS. 13–15, the user interface 55 includes a "FILTER CHECK" indicator in the form of a light emitting diode ("LED") 62 that is illuminated upon the expiration of a predetermined period of time. When the filter check LED 62 is illuminated, the operator is reminded to clean the air filter 58, at which time the operator actuates a switch 68 labeled "FILTER CHECK," thereby resetting the filter check LED 62. After expiration of the predetermined period of time, the LED is once again illuminated to remind the operator to clean the filter 58.

Although the filter check LED 62 described above is illuminated upon the expiration of a period of time, the scope of the present invention also includes the illumination of the filter check LED 62 upon the occurrence or detection of any condition that is indicative of a resistance to the flow of air through the air filter 58. For instance, the flow rate of air being discharged from the air conditioner 10 or the pressure drop across the air filter 58 can be monitored to detect the accumulation of debris to a level requiring the air filter 58 to be cleaned. Regardless of the means to determine when the air filter 58 needs to be changed, the operator is alerted to the condition and provided with the ability to reset the notification at the user interface 55.

FIGS. 13 and 14 are illustrative examples of a user interface 55 provided to the air conditioner 10 according to the present invention. Input keys 72 are disposed on a surface 76 of the user interface 55 that is accessible to an operator in the room 22 when the air conditioner 10 is installed in the window frame 12. The input keys 72 can be touchpads, digital or analog controllers, or any other input device that allows control instructions to be input to the air conditioner 10. According to an illustrative embodiment of the present invention, the input keys 72 allow the operator to activate and deactivate the air conditioner 10, and input at least one of a desired fan speed, an operational mode of the air conditioner 10, and a period of operation. Visual indicators 82 are associated with one or more of the input keys 72 to notify those located adjacent to the air conditioner 10 of a currently selected setting. The visual indicators 82 include any device, such as LEDs, backlights, a liquid crystal display, or the like that can illuminate or otherwise visually distinguish a selected input key 72 from the remaining, unselected input keys 72.

Another visual indicator 85 can be provided to the user interface 76 to indicate a current status of the air conditioner 10, such as standby mode, defrost, power on/off, in use, or any other condition or status for which a visual indicator 82 is not already provided. The visual indicator 85 can be of a type similar to the visual indicators 82 described above, or it can be any other device that will provide visual notice of the occurrence of an event or condition. However, the visual indicator 85 may or may not be associated with a particular input key 39.

The input key 39 identified as "ON/OFF" operates a power switch 88 for activating and deactivating the air conditioner 10. When the air conditioner 10 is activated, actuation of the power switch 88 overrides the currently selected operational mode and fan speed to deactivate the air conditioner 10. Activation of the air conditioner 10 with the power switch 88 will activate the air conditioner 10 to a default setting, or, if the air conditioner 10 is being restarted, to either the default setting or the previously selected setting as described in detail below.

In addition to the power switch 88 the user interface 55 also includes at least a set of mode selection keys 91 and a set of fan speed adjustment keys 93. The mode selection keys 91 allow the operator to select an operational mode of the air conditioner 10 from choices such as "COOL," "ENERGY SAVER," and "FAN ONLY." The operational modes of the air conditioner 10 are the available methods from which the operator can choose to control the ambient environment within the room 22. The COOL operational mode maintains the temperature of the room to within a close tolerance of a set temperature $T_s$ input by the operator by periodically activating and deactivating the refrigeration unit while the fan motor 52 continuously operates. In contrast, the FAN ONLY operational mode causes air in the room 22 to be circulated by continuously operating the fan motor 52 without activating the refrigeration unit 26. In between those operational modes is the ENERGY SAVER operational mode that controls the temperature of the room 22 by periodically activating and deactivating both the refrigeration unit 26 and the fan motor 52. Electrical power is conserved by deactivating both the refrigeration unit 26 and the fan motor 52 during periods when cool air is not required to maintain the temperature in the room below a predetermined temperature. The speed of the fan motor 52 is controlled during periods when the fan motor is activated according to the operational modes by operator input instructions such as "FASTER," "SLOWER," "AUTO FAN," and "ENERGY SAVER."

A dedicated input key 72 can be assigned to each of the available operating modes, to a plurality of the operating modes, or the operating modes can be selected by scrolling through a menu of available operating modes and selecting the desired operational mode with a selection key (not shown). As previously mentioned, a visual indicator 82 is associated with the input keys 72 to notify those adjacent to the air conditioner 10 of the currently selected operating mode.

The fan speed adjustment keys 93 are provided to allow the operator to substantially continuously adjust the speed of the fan motor 52 that drives the fan 48 and blower wheel 50 in an increasing and decreasing manner to virtually any speed between predetermined upper and lower speed limits. As used herein and in the appended claims, substantially continuously adjusting the speed includes selecting and adjusting the speed of the fan motor 52 in fine increments to provide a generally continuous and smooth adjustment of the fan motor 52 speed, as distinguished from selecting one of 2 or 3 discrete speeds. A sinusoidal electric power signal from a power supply 116 is modulated to control an amount of electrical power that reaches the fan motor 52 such that the speed of the fan motor 52 is gradually adjusted along a curve relating the speed of the fan motor 52 to time. The adjustment of the speed of the fan motor 52 is performed in a substantially continuous manner in suitably fine increments that the adjustment of the fan motor speed approaches that which can be achieved in a variable analog manner. Because control unit 96 can be a digital controller, the size of the incremental steps that the fan motor 52 speed can be adjusted is limited by properties such as the data width of a signal transmitted by the control unit 96 to control the speed of the fan motor 52. For example, a 16 bit control unit 96 will transmit a signal having at most 16 bits to control the speed of the fan motor 52. In contrast, a 128 bit control unit 96 can transmit a control signal of up to 128 bits. A large data width signal can control the speed of the fan motor 52 in finer increments than a small data width signal.

In the case of a digital control unit 96, it is apparent that controlling the speed of the fan motor 52 in a truly analog manner is inhibited by the data width of the signal the control unit 96 can transmit. Even a large data width, such as 256 bits, will adjust the speed of the fan motor 52 in a stepwise fashion, although the size of the steps is sufficiently small to approximate analog adjustment of the fan motor 52 speed. Further discussion of the substantially continuous adjustment of the fan motor 52 speed is set forth below.

A multi-position switch 95 (FIG. 2) is included as part of a control unit 96 to establish the upper and lower speed limits of the fan motor 52. The multi-position switch 95 can be configured to a plurality of settings to vary the upper and lower speed limits to accommodate fan motors 52 having different sizes and ratings. The upper and lower speed limits respectively correspond to the maximum and minimum amounts of electrical power to be supplied to the fan motor 52 by the control unit 96. At least a faster key 99 and a slower key 103 are provided to the user interface 55 for allowing the operator to substantially continuously increase and decrease the fan motor speed as desired, with the visual indicator 82 of the selected key being illuminated.

Also included as part of the user interface are temperature and time keys 106 that allow the operator to input a desired time and duration of operation and/or a set temperature $T_s$. Increasing and decreasing the time and/or set temperature $T_s$ is accomplished via the respective increase or decrease temperature and time key 106. In certain modes of operation as explained in detail below, features of the air conditioner 10 will be activated and deactivated as a function of time, as a function of a measured ambient room temperature $T_R$, or both. The room temperature $T_R$ is a temperature sensed by a temperature sensor 109, such as a thermistor, thermometer, thermocouple, or other temperature sensing device in at least one location that represents a generalized temperature of the room 22 as experienced by occupants thereof. This room temperature $T_R$ is used herein as a representation of an actual room temperature regardless of temperature gradients that could possibly exist in different portions of the room 22. Thus, for convenience and to clearly explain the present invention, the room temperature $T_R$ measured by the temperature sensor 109 is considered to be the room temperature.

A display portion 112 can be provided to the user interface 55 to display an alpha-numeric, graphical, or other similar representation of time, fan speed, operational mode, set temperature $T_s$, measured room temperature $T_R$, filter condition, or any other item, or any combination thereof. As shown in FIGS. 13–15, the display portion 112 includes a two-digit digital display capable of displaying representative numbers from 00 through 99, wherein the values 00 and 99 represent the upper and lower limits of the displayed item, respectively. All values greater than 00 and less than 99 are displayed to indicate the value of the displayed item relative to the upper and lower limits. For example, if the value 33 is displayed as the currently selected fan motor speed, this would correspond to a fan motor speed that is approximately one-third of the maximum speed. To display an item requiring more than two digits a suitably sized display portion 112 can be provided to the user interface 55. In the case of a timer display, a display portion having two digits can be implemented to display hours, such as 0.5 hours, 1.0 hours, 1.5 hours, 2.0 hours, etc. Alternative, the display portion can have four or more digits for displaying hours and minutes. Similarly, for a temperature display, two digits are generally sufficient for the display portion 112, however, to display the measured ambient temperature in certain environments, three digits may be necessary. Further, the display portion 112 can be a simple numerical display as shown in FIGS. 13–15, or it can be a graphical liquid crystal display, or other display device.

FIG. 12 illustrates a user interface 55 provided as a remote device 113 to allow the air conditioner 10 to be controlled from a remote location. Instructions input via the remote device 113 are communicated to the control unit 96 of the air conditioner 10 via a wireless connection such as an infrared communication link, or a radio link for example. The remote device 113 is provided with control features similar to those provided to the user interface 55 described above.

Figure 2:
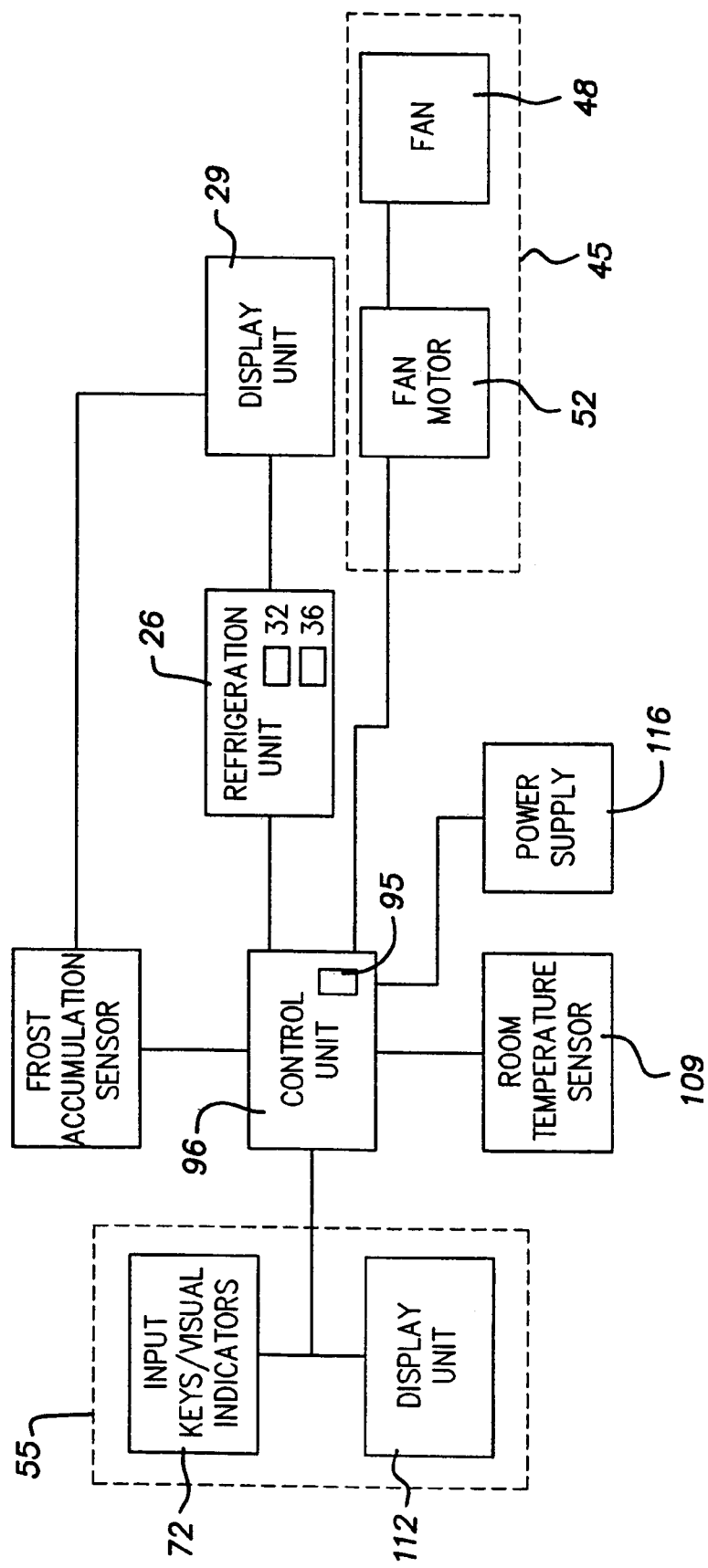
FIG. 2 is a block diagram of an illustrative arrangement of components of a variable speed air conditioner in accordance with the present invention.

FIG. 2 is a schematic illustration of air conditioner 10 components in accordance with the present invention. In substantially continuously adjusting the fan speed, the control unit 96 regulates the amount of electrical power supplied from a power supply 116 to the fan motor 52 in response to an operator input instruction via the user interface 55. The power supply 116 can be any source of an alternating current such as a generator or a public utility, well known to be sources of electrical power delivered as a sinusoidal signal. Further, a non-oscillating electrical power signal can be converted into an oscillating signal having a suitable amplitude to drive the fan motor 52 at an appropriate speed.

According to the illustrative embodiment, the control unit 96 regulates the amount of electrical power delivered to the fan motor 52 to control its speed. The control unit 96 can "chop," or limit the amplitude of a peak portion of the sinusoidal signal delivered by the power supply 116, perform pulse width modulation to regulate the length of pulses of electrical power delivered to the fan motor 52, or otherwise modulate sinusoidal electrical power to be delivered to the fan motor 52. Controlling the electrical power signal delivered to the fan motor 52 coincides with the operator input instruction. For example, during a steady state operation of the fan motor 52, chopping of the sinusoidal signal delivered by the power supply is performed during both positive and negative cycle peaks such that the electrical power supplied to the fan motor 52 is generally the same for both cycles. Chopping the sinusoidal signal with the same frequency as the electric power delivered by the power supply 116 creates a supply of electrical power having a regulated amplitude to the fan motor 52. For a common 60 Hertz sinusoidal signal from a conventional power supply 116 such as a public utility, for example, the chopping is repeated 60 times per second to continuously supply electrical power with the appropriate amplitude to the fan motor 52.

To substantially continuously adjust the speed of the fan motor 52, the degree to which the sinusoidal wave is chopped and/or pulse width modulated is altered. Altering the chopping and/or modulation of the sinusoidal electric power from the power supply 116 controls the electrical power that reaches the fan motor 52 such that the speed of the fan motor 52 is gradually adjusted along a curve relating the speed of the fan motor 52 to time. The relationship between the speed of the fan motor 52 and time during adjustment of the fan motor speed can be linear, curvilinear, or other smooth curve, so long as the fan motor speed is not instantaneously adjusted from one speed setting to another. Instead, the sound of the fan motor 52 while its speed is increasing or decreasing is perceptible as a tone having a smooth, gradually changing pitch or frequency. The speed of the fan motor does not instantaneously jump between speeds in a short period of time. In other words, the adjustment of the speed of the fan motor 52 is performed in a substantially continuous manner in such fine increments that the adjustment of the fan motor speed approaches that which can be achieved in a variable analog manner.

According to an embodiment of the present invention, the control unit 96 is a circuit for chopping a sinusoidal waveform voltage as described above. Suitable solid state devices that can be included as part of the control unit 96, such as power transistors, silicon controlled rectifiers ("SCRs") and other electronic switches that can be used to rapidly switch the sinusoidal electric power delivered by the power supply 116 on and off, chop the appropriate portions of the sinusoidal waveform. A triode AC switch ("TRIAC") is an example of such a suitable solid state device that can conduct a sinusoidal voltage waveform during both positive and negative cycles. The TRIAC includes a gate to which a voltage is applied to turn the device on and off, thereby controlling the voltage across its two power terminals. Whether the TRIAC is conducting in the positive or the negative cycle depends on the polarity of the voltage applied to the gate. Controlling the timing and duration of the voltage applied to the gate causes an appropriate portion of the sinusoidal waveform delivered by the power supply 116 to be chopped to drive the fan motor 52 according to operator input instructions input via the user interface 55. To adjust the speed of the fan motor 52, such as when a new instruction is input with the user interface 55, the degree of chopping performed by the TRIAC is changed to either increase or decrease the percentage of the voltage sinusoidal waveform that reaches the fan motor 52. However, the change in the degree of chopping is performed gradually in an analog manner.

As the speed of the fan motor 52 is adjusted as just described, a number is displayed on the display portion 112 to indicate the speed of the fan motor 52 relative to the upper and lower limits. FIGS. 13–15 include the two-digit display portion 112 described above, thus allowing the numbers 10 through 99 to be displayed. However, these numbers do not necessarily translate into a fan motor 52 having 90 distinct speed settings. Instead, since the speed of the fan motor 52 is substantially continuously adjustable in fine increments, there can be more than 90 incremental speed settings. In such a case when the display portion 112 lacks a sufficient number of digits to accurately represent the true speed of the fan motor 52, the displayed number is merely rounded to an integer value that most closely approximates the actual speed of the fan motor 52.

Figure 3:
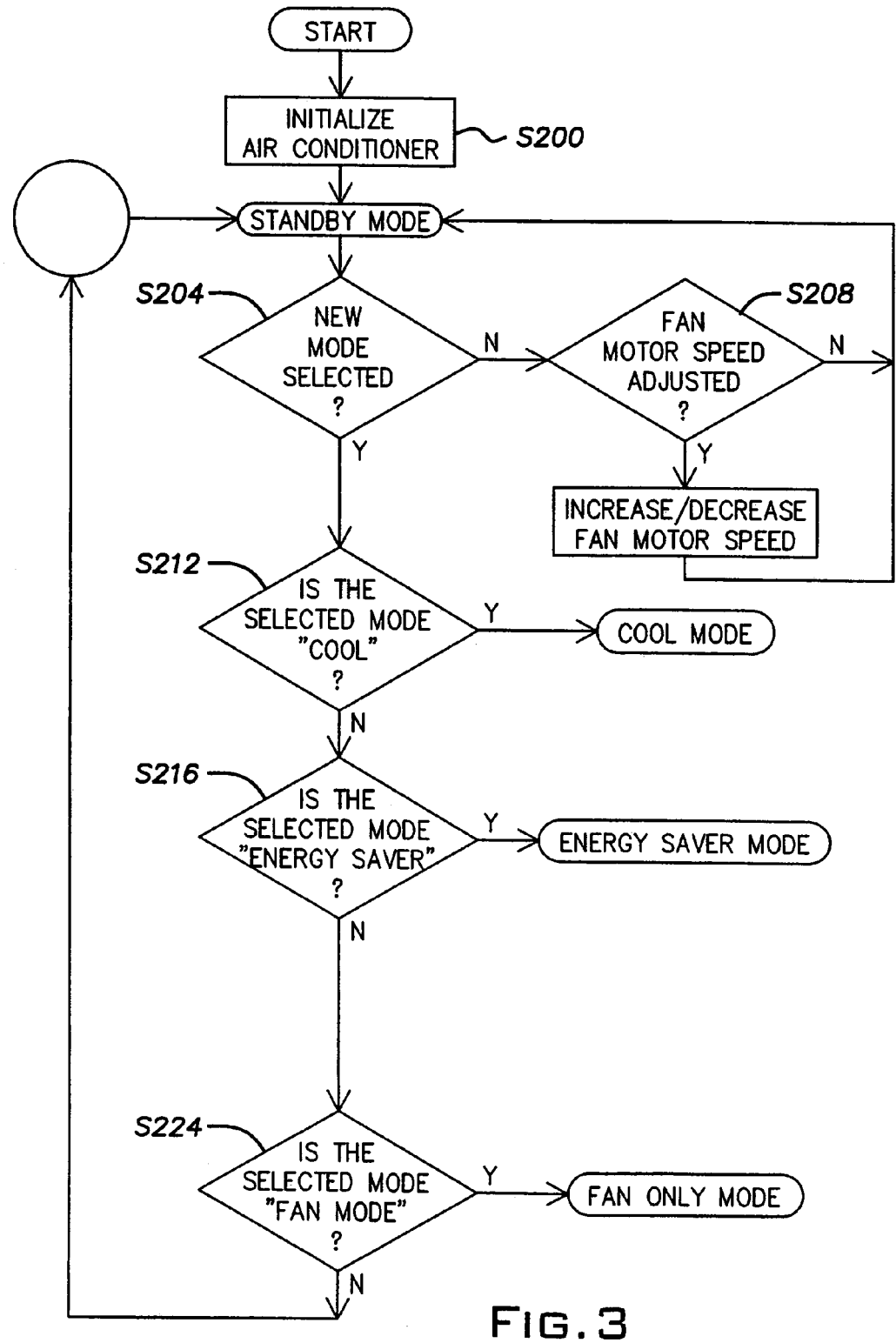
FIG. 3 is a flow chart illustrating a method of controlling a variable speed air conditioner in accordance with the present invention.

FIGS. 3–12 illustrate a method for controlling a variable speed air conditioner 10 according to an illustrative embodiment of the present invention. With reference to FIG. 3, when the air conditioner 10 is activated by manipulation of the power switch 88, the air conditioner 10 is initialized by the control unit 96 at step S200 (see also FIG. 2). During initialization, the speed of the fan motor 52 and the operational mode of the refrigeration unit 26 can be set to any predetermined setting. According to the illustrative embodiment, the air conditioner 10 will return to the settings selected prior to an electrical power interruption causing deactivation of the air conditioner 10 for a period of less than four (4) hours. An electrical power interruption lasting longer than four (4) hours will cause the air conditioner 10 to initialize to a default setting stored in the control unit 96. In the illustrative embodiment, default initialization includes setting the operational mode to COOL, the set temperature $T_s$ to 60° F., and the speed of the fan motor 52 to a relatively high value to display a numeral such as 75 on the display portion 112. Although the illustrative embodiment default initialization settings are described herein with reference to specific values, these are merely arbitrary values to clearly explain the operation of the present invention. And regardless of the settings selected as the default settings, the appropriate visual indicators 82 of the user interface 55 are illuminated. Once the air conditioner 10 has been initialized the control unit 96 proceeds using the settings set during initialization and then enters a standby mode waiting for an operator input instruction.

At step S204 it is determined whether a new operational mode has been selected by an operator by pressing one of the mode selection keys 91 of the user interface 55. If not, the control unit 96 proceeds to step S208 to determine whether a fan motor speed different than the currently set speed has been selected by the operator. The operator has the option of substantially continuously increasing and decreasing the speed of the fan motor 52 with the fan speed adjustment keys 93, and possibly selecting an "AUTO FAN" function during step S208 depending on the current operational mode. As described below, AUTO FAN controls the speed of the fan motor 52 based on the relationship between the set temperature $T_s$ and the room temperature $T_R$, and is only available as an option in the COOL and ENERGY SAVER operational modes. Upon completion of step S208 and substantially continuously adjusting the speed of the fan motor 52 according to any instructions input during that step, the method returns to the standby mode to await further operator input instructions.

If, during step S204, it is determined that a new operational mode has been selected, then the control unit 96 proceeds through one or more of steps S212, S216 and S224 to call a subroutine corresponding to the selected operational mode. The COOL, ENERGY SAVER, and FAN ONLY subroutines will each be described separately.

Figure 4:
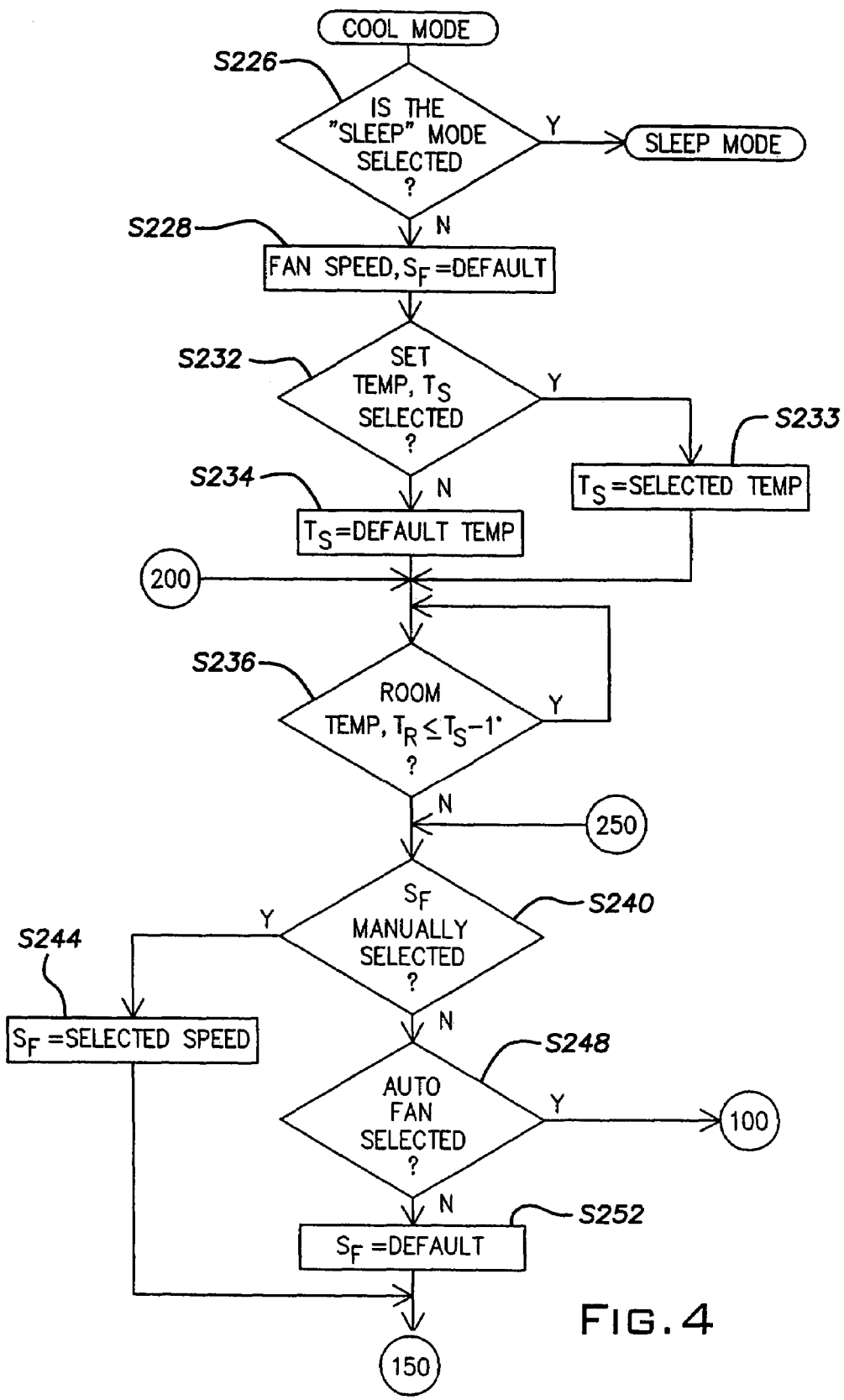
FIG. 4 is a flow chart illustrating a method of controlling a variable speed air conditioner according to a COOL operational mode subroutine in accordance with the present invention.
Figure 5:
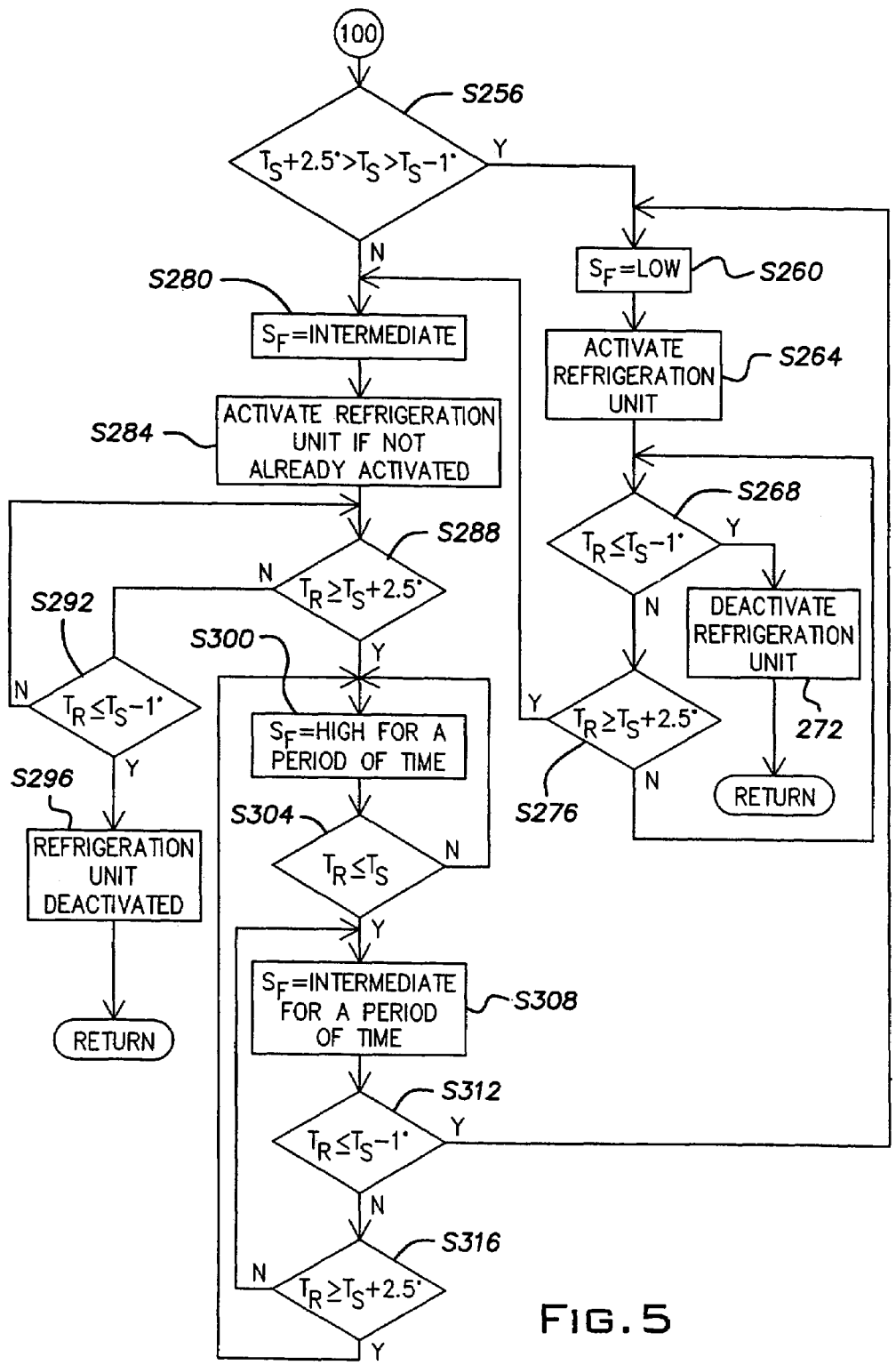
FIG. 5 is a flow chart illustrating a method of controlling a variable speed air conditioner according to a COOL operational mode subroutine with an AUTO FAN function activated in accordance with the present invention.
Figure 10:
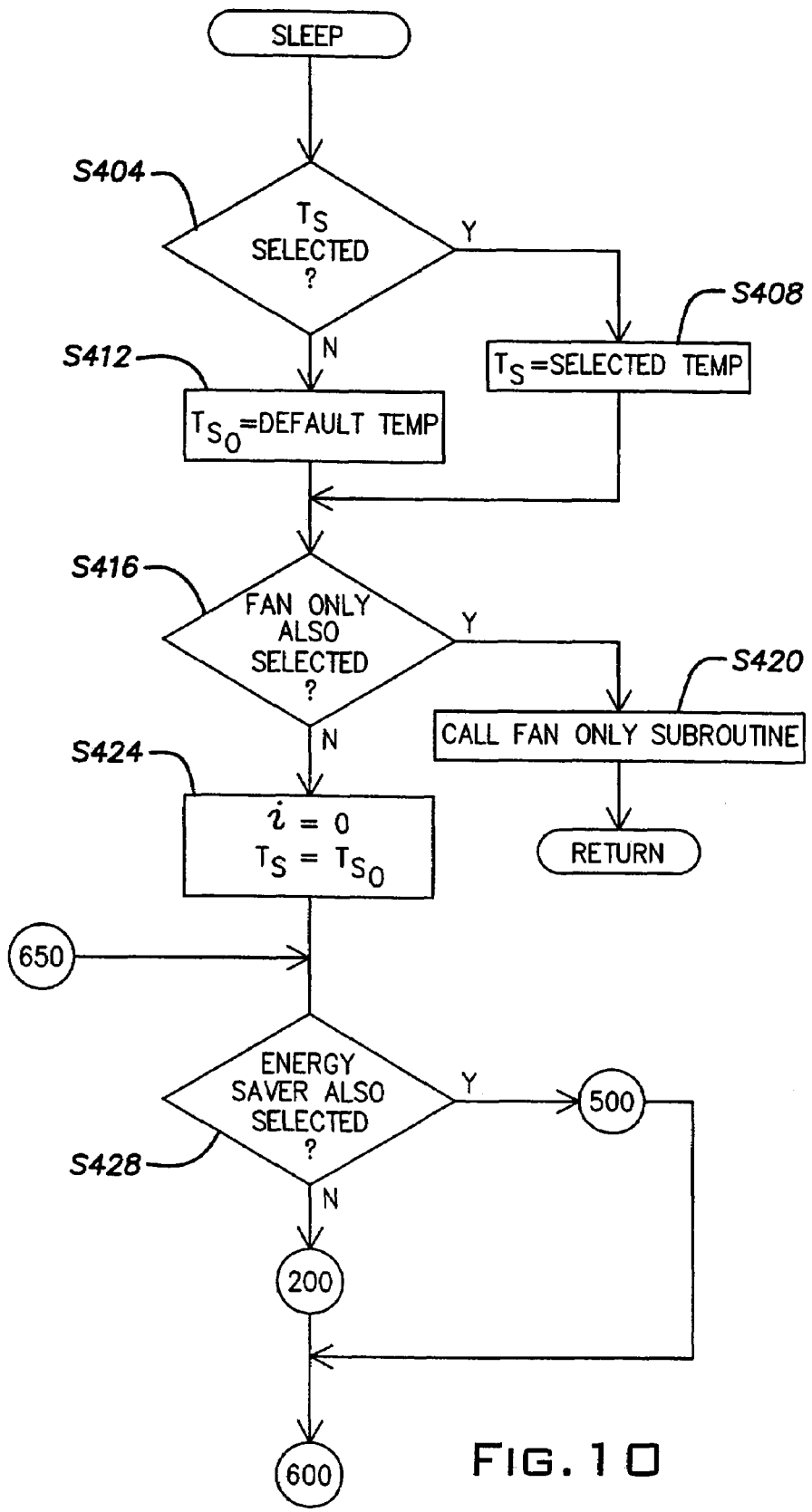
FIG. 10 is a flow chart illustrating a method of controlling a variable speed air conditioner when a SLEEP function is activated in accordance with the present invention.
Figure 11:
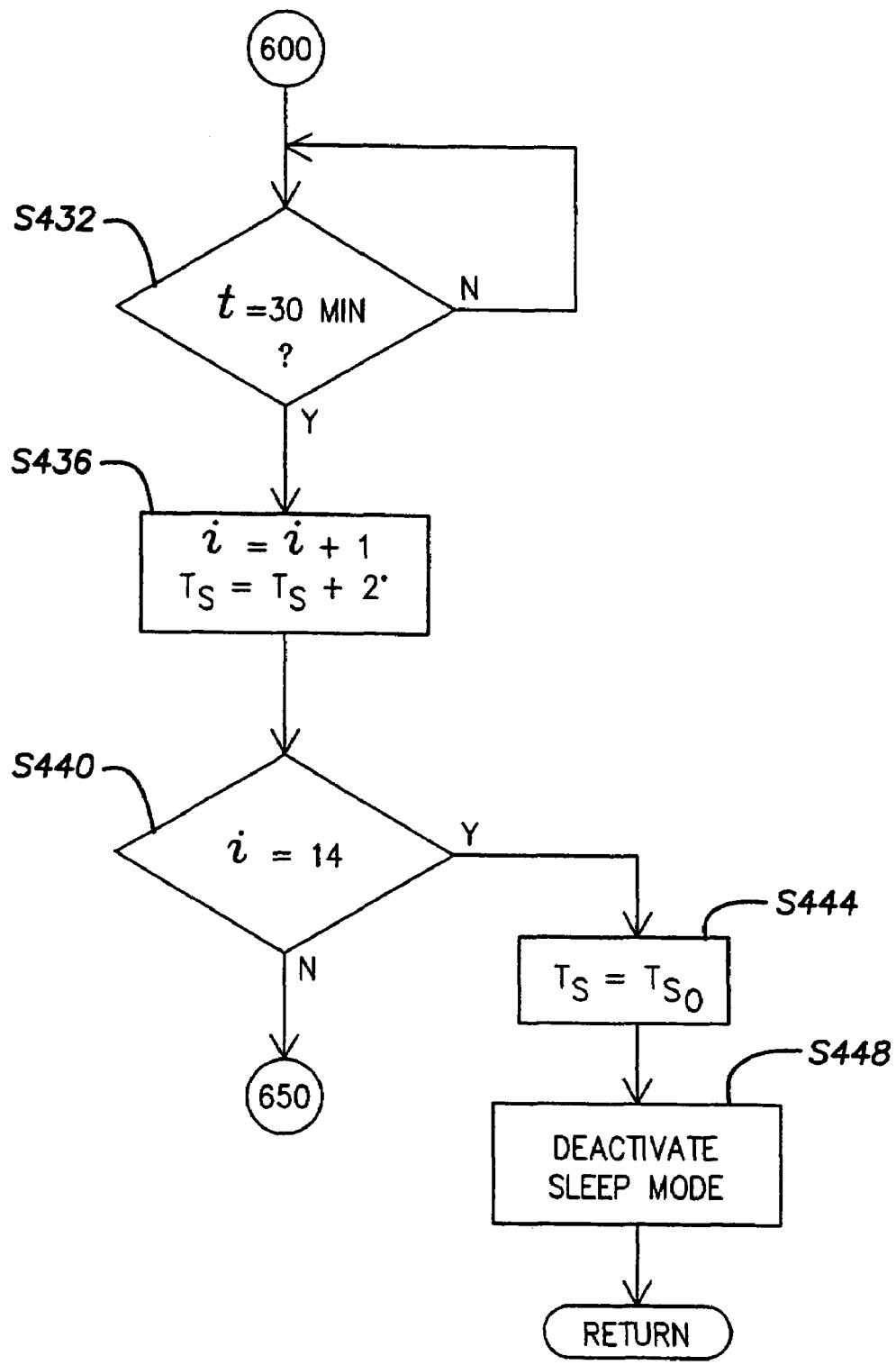
FIG. 11 is a flow chart illustrating a method of controlling a variable speed air conditioner when a SLEEP function is activated in accordance with the present invention.

FIGS. 4–6 provide an illustrative example of the COOL operational mode subroutine, which is called as a result of an affirmative answer to the query of step S212. In the COOL operational mode, the control unit 96 operates the refrigeration unit 26 as necessary to cool the room 22, while continuously driving the fan motor 52. Specifically, at step S226, if the SLEEP mode has been selected, operation proceeds to step S404 (FIG. 10). If not, the fan motor 52 is initially set to a default speed at step S228 in a manner similar to that during initialization of the air conditioner 10. If the fan motor 52 has been activated during initialization S200 of the air conditioner 10, then the current speed of the fan motor 52 is maintained as the default speed. However, the operator can adjust the fan motor speed at any point during the control method of the present invention even where not explicitly shown in the flow chart. Regardless of the subroutine called, the fan motor 52 is always to be activated prior to activation of the refrigeration unit 26 and deactivated after deactivation of the refrigeration unit 26 to help minimize the accumulation of frost on the surface of the heat exchanger 29. This will prevent a condition where the low temperature, low pressure refrigerant is flowing through the heat exchanger 29 in the absence of air being blown by the blower wheel 50.

At step S232 it is determined whether the operator has specified a specific set temperature different from the default temperature established as the set temperature $T_s$ during initialization S200. If so, the selected temperature is set as the set temperature $T_s$ at step S233. Otherwise, the default temperature remains the set temperature $T_s$ at step S234.

With the fan motor 52 activated and the set temperature $T_s$ established, the room temperature $T_R$ is sensed by the temperature sensor 109 and compared to the set temperature $T_s$. Unless the room temperature $T_R$ is determined to be greater than the set temperature $T_s$ minus one (1) degree at step S236, the refrigeration unit 26 remains deactivated while the fan motor 52 continues to operate. After the room temperature $T_R$ rises above the set temperature $T_s$ minus one (1) degree, the control method proceeds to step 240. At step S240 if the operator has adjusted the speed of the fan motor 52 via the fan speed adjustment keys 93, the control method proceeds to step 244 where the fan motor speed is set to the manually adjusted speed and then proceeds with manual fan operation at step S320 (FIG. 6). If the fan motor speed has not been adjusted, and if the AUTO FAN function has not been selected (S248), at step S252 the default fan motor speed remains the current fan motor speed and then proceeds with manual fan operation at step S320 (FIG. 6).

FIG. 5 illustrates the AUTO FAN function of the present invention in the COOL operational mode. If it is determined that AUTO FAN is selected at step S248, the control unit 96 again compares the room temperature $T_R$ to the set temperature $T_s$ at step S256. If the room temperature $T_R$ falls between predetermined limits, the fan motor speed is set to a predetermined low value at step S260 and then the refrigeration unit 26 is activated at step S264 following a brief delay. According to step S256 of the illustrative embodiment, the room temperature $T_R$ must fall between two and a half (2.5) degrees above the set temperature $T_s$ and one (1) degree below the set temperature $T_s$. However, the predetermined limits can vary without departing from the scope of the present invention. The room temperature $T_R$ is then monitored and compared to the set temperature $T_s$ minus one (1) degree at step S268 so that the refrigeration unit 26 can be deactivated at step S272 when the room temperature $T_R$ is equal to, or falls below that temperature. The method then returns to position 200 in the COOL operational mode subroutine shown in FIG. 4.

If, at step S268 the room temperature $T_R$ is still greater than the set temperature $T_s$ minus one (1) degree, it is determined whether the room temperature $T_R$ is greater than or equal to the set temperature $T_s$ plus two and a half (2.5) degrees at step S276. A negative response to this inquiry returns the method to step S268 and this portion of the method is repeated. However, should the room temperature $T_R$ rise to a temperature equal to or above the set temperature $T_s$ plus two and a half (2.5) degrees, the speed of the fan motor 52 is increased from the predetermined low speed to a predetermined intermediate speed at step S280. Similar to the high speed described above, an intermediate speed is a speed located approximately midway between the upper and lower speed limits. In the case of the illustrative embodiment including the two-digit display, an intermediate value could be represented by the number 50, which is approximately the midpoint between 00 and 99. However, it is understood that other intermediate values are also within the scope of the present invention. Regardless of the numerical representation of the intermediate speed, substantially continuously adjusting the fan speed to the intermediate speed increases the flow of cool air into the room 22 to counter the rise in the room temperature $T_R$.

Going back to the initial step of the AUTO FAN function at step S256, if the room temperature $T_R$ is not within the range defined by the predetermined limits (meaning the room temperature $T_R$ is greater than or equal to the set temperature $T_s$ plus two and a half (2.5) degrees) then the fan motor speed is adjusted to the predetermined intermediate value at step S280, followed by activation of the refrigeration unit 26 at step S284, if not already activated. After a brief delay (not shown) to allow the room 22 to cool, the room temperature $T_R$ is once again compared to the set temperature $T_s$ plus two and a half (2.5) degrees at step S288. If the room temperature $T_R$ has fallen below this temperature with the fan motor 52 operating at the predetermined intermediate speed, but has not cooled to a temperature equal to, or below the set temperature $T_s$ minus one (1) degree at step S292, the method returns to step S288. This cycle continues until the condition is satisfied, or, the AUTO FAN function is deactivated. Should the room temperature $T_R$ fall below the set temperature T, minus one (1) degree at step S292 with the fan motor 52 operating at the predetermined intermediate speed, the refrigeration unit 26 is deactivated at step S296 and the method again returns to position 200.

At step S288, if the fan motor 52 operating at the predetermined intermediate speed for a period of time was unable to lower the room temperature $T_R$ to a temperature equal to, or less than the set temperature $T_s$ plus two and a half (2.5) degrees, then the fan motor speed is adjusted to a predetermined high speed at step S300. Another brief delay (not shown) follows adjustment of the fan motor speed to allow the air conditioner 10 with the fan motor 52 operating at the high speed to lower the room temperature $T_R$. After the delay with the fan motor 52 operating at the high speed, it is determined if the room temperature $T_R$ has been lowered to become equal to, or less than the set temperature $T_s$ at step S304. If not, the method is returned to step S300 and will continue to be returned to step S300 until the room temperature $T_R$ is less than or equal to the set temperature $T_s$. However, if the room temperature $T_R$ has fallen below the set temperature $T_s$, the fan motor speed is adjusted at step S308 to the predetermined intermediate speed and allowed to operate at that speed for a period of time.

Following this period of fan motor operation, if it is determined that the room temperature $T_R$ has continued to fall at step S312 such that it has become less than or equal to the set temperature $T_s$ minus one (1) degree, then the method continues to step S260 where the fan motor 52 is operated at the predetermined low speed. Otherwise, it is determined at step S316 whether the room temperature $T_R$ has once again climbed above or equal to the set temperature $T_s$ plus two and a half (2.5) degrees. If so, the method returns to step S300 and the fan motor speed is adjusted back to the predetermined high speed. However, if the room temperature $T_R$ is within the range defined by the set temperature $T_s$ plus two and a half (2.5) degrees and the set temperature $T_s$ minus one (1) degree, the method goes to step S312, and will continue to return to step S312 until the room temperature $T_R$ falls outside of that range.

The method of controlling the fan motor 52 according to the AUTO FAN function described above is continuously repeated for as long as that feature is selected. Should the operator input an operational mode via the user interface 55 that does not permit the fan motor speed to be controlled according to the AUTO FAN function, the speed of the fan motor 52 will be adjusted to a default speed determined in a manner similar to that during initialization of the air conditioner 10. Once the default fan motor speed is established, the operator can substantially continuously adjust the speed of the fan motor 52 via the fan speed adjustment keys 93. Further, actuation of one or both of the fan speed adjustment keys 93 while the AUTO FAN function is selected will deactivate the AUTO FAN function and restore manual adjustment of the fan motor speed.

Although the description of the AUTO FAN function includes specific temperatures and ranges of temperatures, they are used merely as an example to clearly explain the method of controlling the air conditioner 10 according to this function. It is understood that other temperatures and ranges of temperatures can be used with the AUTO FAN function without departing from the scope of the present invention. Also, any adjustment of the fan motor speed in this specification is accomplished in a substantially continuously variable manner as that phrase has been defined herein. Accordingly, the predetermined high, intermediate and low speeds of the fan motor 52 correspond to speeds that can be displayed on the display portion 112 of the illustrative embodiment as large, intermediate and small numbers, respectively, on an ascending scale of 00 to 99. The displayed number can, for example, be indicative of the percentage of the sinusoidal voltage waveform supplied by the power supply 116 that reaches the fan motor 52 instead of a predetermined fan motor speed setting.

FIG. 6 illustrates a method of controlling the air conditioner 10 in accordance with the present invention in the COOL operational mode when the AUTO FAN function is not selected. Instead, the speed of the fan motor 52 is substantially continuously increased and/or decreased via the respective fan speed adjustment keys 93 while the refrigeration unit 26 is activated and deactivated as necessary to control the ambient temperature of the room 22. The set temperature $T_s$ and fan motor speed are initially established in a manner similar to that described above for the AUTO FAN function. With the fan motor 52 operating, the refrigeration unit 26 is activated at step S320. The refrigeration unit 26 remains activated until it is determined at step S324 that the room temperature $T_R$ is less than or equal to the set temperature $T_s$. When this condition is satisfied the refrigeration unit 26 is deactivated at step S238, followed by a brief delay. The room temperature is subsequently compared to the set temperature $T_s$ at step S242 to ensure that this condition remains satisfied. If so, the method returns to position 200 to resume control of the fan motor speed.

Figure 7:
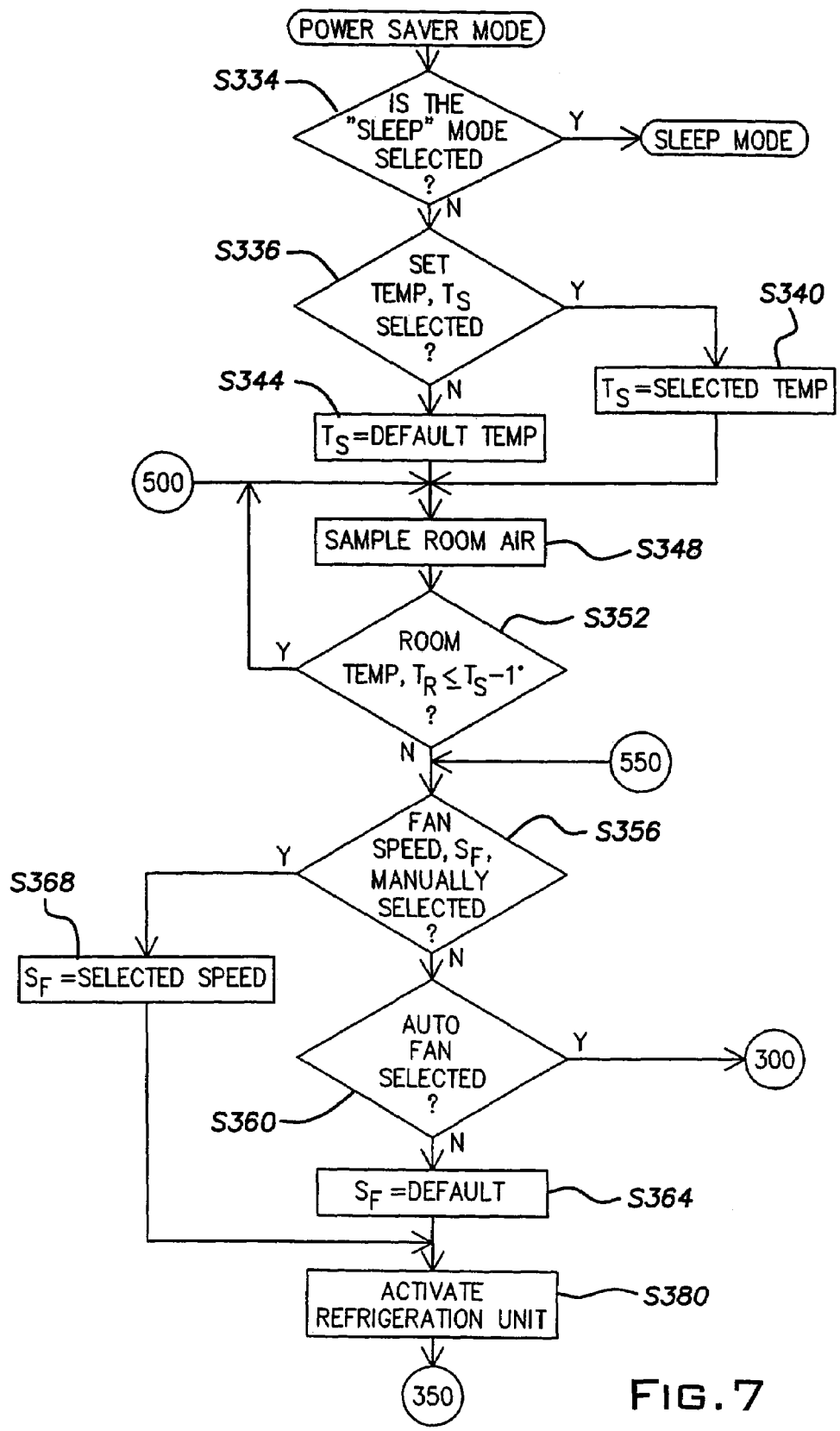
FIG. 7 is a flow chart illustrating a method of controlling a variable speed air conditioner according to a ENERGY SAVER operational mode subroutine in accordance with the present invention.
Figure 8:
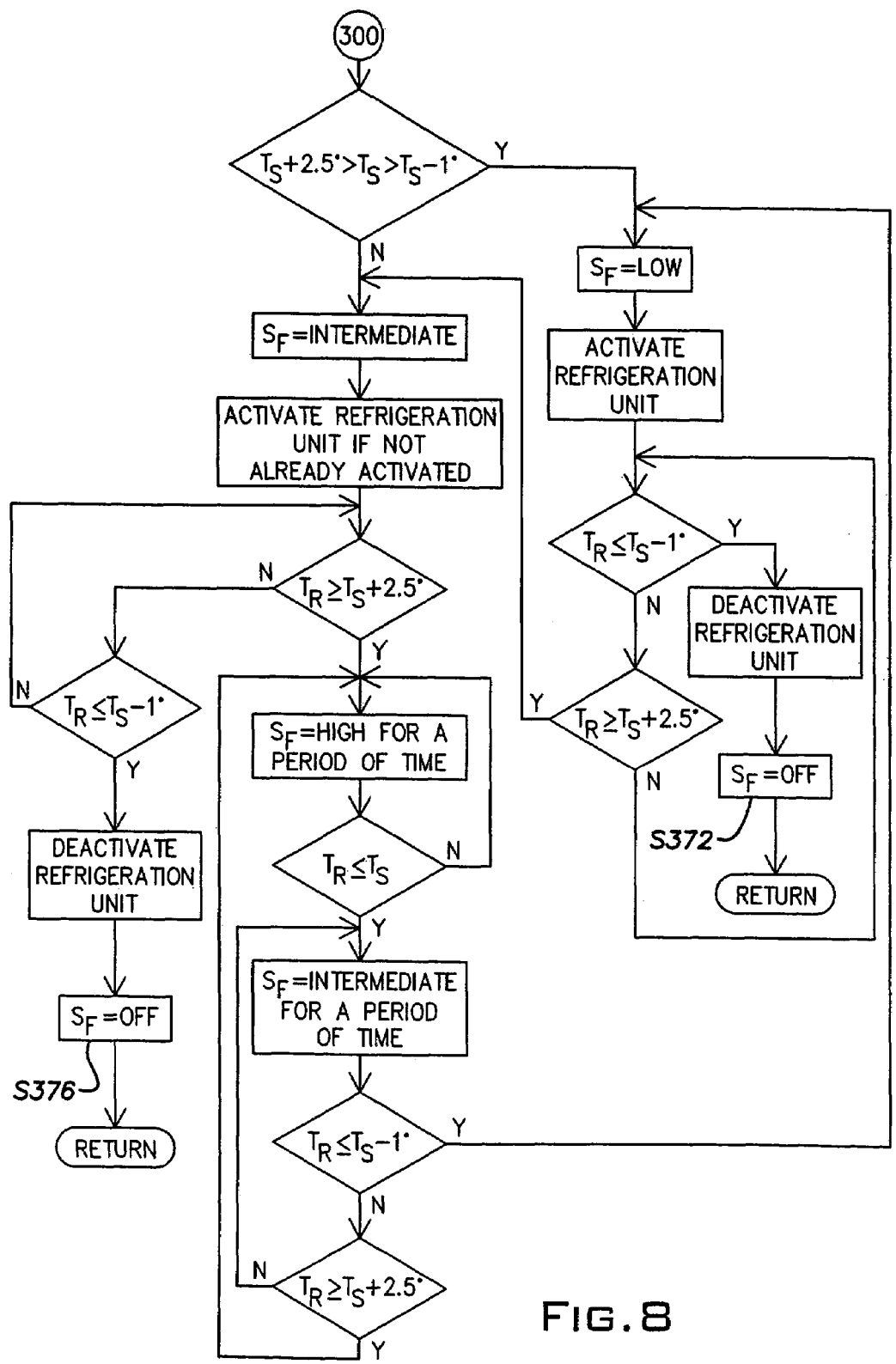
FIG. 8 is a flow chart illustrating a method of controlling a variable speed air conditioner according to a ENERGY SAVER operational mode subroutine with an AUTO FAN function activated in accordance with the present invention.

FIGS. 7–9 illustrate the ENERGY SAVER operational mode according to the illustrative embodiment of the present invention. In the ENERGY SAVER mode, both the refrigeration unit 26 and the fan motor 52 are activated and deactivated as necessary to control the room temperature RT. However, as mentioned above, the fan motor 52 is to be activated prior to activation of the refrigeration unit 26, and deactivated after deactivation of the refrigeration unit 26 to minimize the accumulation of frost on the surface of the heat exchanger 29. The description that follows assumes that the fan motor 52 is deactivated upon the selection of the ENERGY SAVER mode.

Upon selection of the ENERGY SAVER mode via the user interface 55, if the SLEEP mode is selected, operation proceeds to step S404 (FIG. 10). If not, the set temperature $T_s$ is established in steps S336, S340 and S344 in the same manner as the set temperature $T_s$ is established in the COOL operational mode. If the set temperature $T_s$ is input by the operator as determined in step S336, then the set temperature $T_s$ is established as that specific temperature in step S340. Otherwise, the set temperature $T_s$ is assigned a default value in step S344.

The ambient air of the room 22 is then sampled at step S348 through a periodic activation of the fan motor 52. To sample the air, the fan motor 52 is activated for approximately two minutes, and then deactivated for approximately ten minutes. This periodic operation of the fan motor 52 draws a sample of air from within the room 22 such that the temperature sensor 109 can detect the room temperature $T_R$ to be compared to the set temperature $T_s$ at step S352. If the room temperature $T_R$ is determined to be less than or equal to the set temperature $T_s$ minus one (1) degree, the air conditioner 10 remains in a standby mode and the periodic sampling of the air continues. The frequency and duration of air sampling can be changed to any value without departing from the scope of the present invention.

When the room temperature $R_T$ exceeds the set temperature $T_s$ minus one (1) degree, the fan motor 52 is activated. Without a manually selected fan motor speed input at step S356, and in the absence of the command to begin the AUTO FAN function at step S360, a default fan motor speed is selected at step S364 in the same manner as the default fan motor speed is selected during initialization of the air conditioner 10 of the illustrative embodiment. If, instead, the speed of the fan motor 52 is manually selected at step S356 by adjusting one or more of the fan speed adjustment keys 93, the speed of the fan motor 52 is substantially continuously adjusted in response to such an instruction at step S368 to the manual selected speed.

As illustrated in FIG. 8, when the AUTO FAN function is activated in the ENERGY SAVER operational mode, the fan motor 52 is controlled in much the same way as it is when the AUTO FAN function is activated in the COOL operational mode. Thus, a detailed description of the steps common to the AUTO FAN function in both the COOL operational mode and in the ENERGY SAVER operational mode is omitted from this discussion. However, the AUTO FAN function in the ENERGY SAVER operational mode also includes deactivation of the fan motor 52 at steps S372 and S376 following the deactivation of the refrigeration unit 26. This differs from the continuously operating fan motor in the AUTO FAN function activated with the air conditioner in the COOL operational mode. Consumption of electrical power is minimized by deactivating the fan motor 52 between periods when the refrigeration unit 26 is activated. Once the fan motor 52 is deactivated according to the AUTO FAN function in the ENERGY SAVER operational mode, the cycle of air sampling at step S348 resumes. The fan motor 52, followed by the refrigeration unit 26 will be activated at any time during air sampling if the temperature sensor 109 transmits a signal indicating that the room temperature $T_R$ has increased above the set temperature $T_s$. When this occurs, the method will proceed as described above.

When the desired speed of the fan motor 52 is manually input at step S356, that speed is set as the fan motor speed at step S368. With the fan motor 52 operating at the desired speed, the refrigeration unit 26 is then activated at step S380. As illustrated in FIG. 9, the refrigeration unit 26 continues to operate to supply the low pressure, low temperature refrigerant to the heat exchanger 29 until the room temperature $T_R$, as sensed by the temperature sensor 109, is less than or equal to the set temperature $T_s$ as determined at step S384. When this occurs, the refrigeration unit 26 is deactivated at step S392 while the fan motor 52 continues to run for a predetermined period of time to minimize the accumulation of frost on the surface of the heat exchanger 29. Following the period of time during which the fan motor 52 operates and the refrigeration unit 26 is deactivated, the fan motor 52 is deactivated at step S396. At step S400 the room temperature $T_R$ is again compared to the set temperature $T_s$ to determine if the room temperature $T_R$ remains less than or equal to the set temperature $T_s$. If the room temperature $T_R$ remains below or equal to the set temperature $T_s$, the method is repeated and the periodic sampling of the air resumes. However, the method returns to position 550 when it is determined at step S400 that the room temperature $T_R$ once again exceeds the set temperature $T_s$ following the deactivation of the refrigeration unit 26 and fan motor 52.

When the air conditioner 10 is operating in either the COOL or ENERGY SAVER operational modes as described above, the operator can select the SLEEP function to gradually adjust the set temperature of the air conditioner 10 over a period of time. The SLEEP function sets the set temperature $T_s$ depending on whether the operator has manually selected a desired set temperature $T_s$ at step S404. If a desired set temperature $T_s$ is input via the user interface 55, that temperature is set as the set temperature at step S408, otherwise, a default temperature will be selected as the set temperature $T_s$ at step S412. Since the SLEEP function is only operable in the COOL and ENERGY SAVER operational modes, a determination that FAN ONLY is currently selected at S416 causes the air conditioner 10 to operate in the FAN ONLY operational mode at step S420, ignoring the SLEEP instruction input by the operator.

When the COOL or ENERGY SAVER operational mode is selected as determined at step S416, the SLEEP function will be activated with the selected operational mode. At step S424, an iteration counter i is initially set to zero while the set temperature is set to an original temperature $T_{so}$, assigned at one of steps S408 and S412. With these initial values established, the method proceeds to one of position 200 and position 500 of the appropriate operational method satisfying step S428, using the original set temperature $T_{so}$ as the set temperature $T_s$ for the operational mode selected. The selected operational mode of the air conditioner 10 is carried out for a period of 30 minutes, the expiration of which is determined at step S432. After 30 minutes elapse, the incremental counter i is increased by one and the set temperature $T_s$ is increased at step S436. Increasing at this rate, the incremental counter i will reach the value of four and the set temperature $T_s$ will increase by four degrees in one hour, as determined at step S440. The set temperature $T_s$, and thus, the room temperature $T_R$ will be gradually increased over an hour and then maintained for a period of seven hours.

At the end of the seven hour period, the set temperature $T_s$ is reset to the original set temperature $T_{so}$, step S444, and the SLEEP function is deactivated at step S448. The air conditioner 10 then operates according to the operational mode selected along with the SLEEP function as if the SLEEP function had not been activated. Other values for the timing and temperature increase for the SLEEP function can be used as desired.

The SLEEP function can be deactivated by actuating the mode selection key labeled "SLEEP." It can also be deactivated by one or more of the following: deactivating the air conditioner 10, exceeding the duration of the SLEEP function, activating the FAN ONLY operational mode, and changing the set temperature, for example. And although the SLEEP function is described herein as increasing the set temperature $T_s$ two (2) degrees every thirty (30) minutes for approximately seven (7) hours, these values are used as examples to clearly explain the SLEEP function of the present invention. Other temperature increments and times can be used without departing from the scope of the present invention.

The AUTO FAN function and the SLEEP function are not operable in the FAN ONLY mode because they are cooling functions that respectively control operation of the refrigeration unit 26 based on the set temperature $T_s$. In contrast, the refrigeration unit 26 is not activated when the air conditioner is in the FAN ONLY operational mode, and thus, the air conditioner 10 does not operate based on the set temperature $T_s$. Instead, the fan motor 52 is set to a speed that can be substantially continuously increased/decreased as desired with the respective fan speed adjustment keys 93 of the user interface 55. By pressing the fan speed adjustment key 93 labeled "faster," the control unit 96 modulates the maximum amplitude of the electrical power signal supplied to the fan motor 52 to substantially continuously drive it at a speed faster than the speed at which the fan motor 52 operated before the fan speed adjustment key 93 was pressed. The inverse is true of pressing the fan speed adjustment key 93 labeled "slower."

At any point in the control method according to the present invention, a signal transmitted by the frost sensor 53 indicating the accumulation of frost on the surface of the heat exchanger 29 overrides the currently selected operational mode of the air conditioner 10. When this occurs, the refrigeration unit 26 is deactivated and the fan motor 52 is continuously operated until the frost sensor transmits a signal indicating that at least a portion of the frost accumulated on the heat exchanger 29 has melted. In overriding the operational mode of the air conditioner 10, the control unit 96 deactivates the refrigeration unit 26 and substantially continuously adjusts the fan motor 52 to a high speed.

According to an alternative embodiment, the control unit 96 can automatically adjust the fan speed, based on voltage fluctuation of the power supply 116. The control unit 96 can be configured to increase the speed of the fan when a low voltage condition occurs, such as during a "brown-out." For example, the fan speed can be increased by a predetermined amount or increased by an amount proportional to the amount of voltage decrease. Running the fan motor 52 faster provides additional air flow to the condenser 36 to help cool and condense the vaporized refrigerant, reducing the pressure difference between the condenser 36 and the evaporator, making the refrigerant easier to compress. This helps reduce the demand on the compressor 32 during the low voltage condition, helping to prevent interruption in the operation of the compressor 32. This also helps to minimize and possibly prevent a reduction in overall cooling performance of the air conditioner 10 during the low voltage condition.

As a further alternative, following a power interruption, the control unit can start the fan motor 52 for a "delayed-start period" before power is reapplied to the compressor 32. This can help to reduce the starting load on the compressor 32 by reducing or eliminating the pressure difference between the condenser coil 36 and the evaporator coil. Similarly to the low voltage operation described above, this delayed starting of the compressor 32 can help equalize the refrigerant system pressures by allowing air to flow through the condenser coil 36 and the evaporator coil. The delayed-start period can be set to any appropriate period, for example, 3 minutes. During the delayed-start period, air will also flow over the housing of the compressor 32, cooling the compressor 32, and helping to improve the starting performance of the fan motor 52. Further, it should be appreciated that the starting of the compressor 32 normally causes a voltage dip due to the increase in current draw. The fan motor 52 has a higher initial current draw that drops to a lower operating current once the fan motor 52 is started. Thus, by waiting for the delayed-start period to start the compressor 32, at which time the fan motor 52 is drawing less current, the voltage dip caused when the compressor 32 starts can be decreased.

According to an additional alternative embodiment, the fan motor starting performance may be improved under low voltage conditions. In this embodiment, during a low voltage condition, if the operator selects a fan motor speed setting at startup that is less than the maximum speed, the control unit 96 automatically applies full line voltage to the fan motor 52 before shifting down to the lower speed setting. This may help avoid a problem caused during low voltage conditions when the low speed windings of a motor have significantly lower starting torque, which can limit the motor's starting performance.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. An air handling system for heating and/or cooling a room, the system comprising:
   a fan assembly to transport air from the system into the room, the fan assembly having a substantially continuously adjustable speed within a range of speeds defined by a predetermined upper limit and a predetermined lower limit;
   a user interface for transmitting a sleep mode signal upon activation of a sleep mode by a user;
   a control unit for controlling the fan assembly and the climate control unit to gradually raise an ambient temperature in the room over a predetermined period of time in response to the sleep mode signal transmitted by the user interface; and
   a climate control unit for heating and/or cooling the air to be transported from the air conditioner by the fan assembly.

2. The air handling system according to claim 1, wherein after gradually raising the ambient temperature, the control unit decreases the temperature to an original set point after a second predetermined period of time.

3. The air handling system according to claim 1, wherein the user interface is a remote device for communicating an operator input instruction to the control unit via a wireless communication link.

4. The air handling system according to claim 3, wherein the wireless communication link is one of a group consisting of a radio frequency communication link and an infrared communication link.

5. The air handling system according to claim 1 further comprising a visual indicator to identify that the sleep mode is currently selected.

6. A variable speed air handling system for heating and/or cooling a room, the air handling system comprising:
   a fan assembly comprising:
   fan motor having a single main stator winding; and
   a fan operatively connected to be driven by the fan motor to transport air from the air handling system into the room;
   a user interface for inputting at least a desired speed of the fan motor;
   a control unit for modulating an electrical power signal delivered to the fan motor to substantially continuously adjust the speed of the fan motor according to the desired speed of the fan motor input via the user interface; and
   a climate control unit for removing thermal energy from the air to be transported from the air handling system by the fan assembly.

7. The variable speed air handling system according to claim 6 further comprising a display portion to display a visual indication of the approximate speed of the fan motor.

8. The variable speed air handling system according to claim 7, wherein the visual indication displayed by the display portion is an integer value representing a speed of the fan motor that most closely approximates an actual speed of the fan motor.

9. The variable speed air handling system according to claim 6, wherein the control unit comprises a multi-position switch for defining the predetermined limits of the fan assembly speed.

10. The variable speed air handling system according to claim 6, wherein the user interface is a remote device for communicating an operator input instruction to the control unit via a wireless communication link.

11. The variable speed air handling system according to claim 10, wherein the wireless communication link is one of a group consisting of a radio frequency communication link and an infrared communication link.

12. The variable speed air handling system according to claim 6, wherein the control unit modulates an amplitude of a sinusoidal voltage waveform supplied to the fan assembly to substantially continuously adjust the speed of the fan assembly.

13. The variable speed air handling system according to claim 6, wherein the an amplitude of a sinusoidal electrical power signal is limited to drive the fan assembly at the desired speed.

14. The variable speed air handling system according to claim 6, wherein pulse width modulation of a sinusoidal electrical power signal drives the fan assembly at the desired speed.

15. The variable speed air handling system according to claim 6, wherein the climate control unit is a refrigeration unit for removing thermal energy from the air to be transported from the system by the fan assembly.

16. A method of controlling an air handling system to be installed in a window of a room, the air handling system comprising a control unit, a climate control unit, and a fan assembly including a fan motor for driving a fan, the method comprising steps of:
providing a user interface to allow at least a desired operational mode of the air handling system and a desired speed of the fan motor to be input by an operator;
controlling, an operation of the climate control unit in response to the desired operational mode input via the user interface; and
adjusting a speed of the fan motor in a substantially continuous manner to drive the fan at the desired speed of the fan motor input via the user interface.

17. The method of controlling an air handling system according to claim 16 further comprising a step of sensing a temperature of the room by the air handling system.

18. The method of controlling an air handling system according to claim 16, wherein the operation of the climate control unit is controlled in response to the desired operational mode input via the user interface and the sensed temperature of the room.

19. The method of controlling an air handling system according to claim 16 further comprising a step of displaying a visual indicator corresponding to the desired speed of the fan motor.

20. A method of controlling an air handling system to be installed in a window of a room, the air handling system comprising a control unit, a climate control unit, and a fan assembly including a fan motor for driving a fan, the method comprising of steps:
providing a user interface to allow at least a desired operational mode of the air handling system and a desired speed of the fan motor to be input by an operator;
controlling an operation of the climate control unit in response to the desired operational mode input via the user interface;
adjusting a speed of the fan motor in a substantially continuous manner to drive the fan at the desired speed of the fan motor input via the user interface; and
before the step of adjusting, providing a higher voltage than required to operate the fan motor at the desired speed.

* * * * *